G. R. DAVIDSON.
STEERING WHEEL LOCK.
APPLICATION FILED JAN. 14, 1920.
1,348,547.
Patented Aug. 3, 1920.
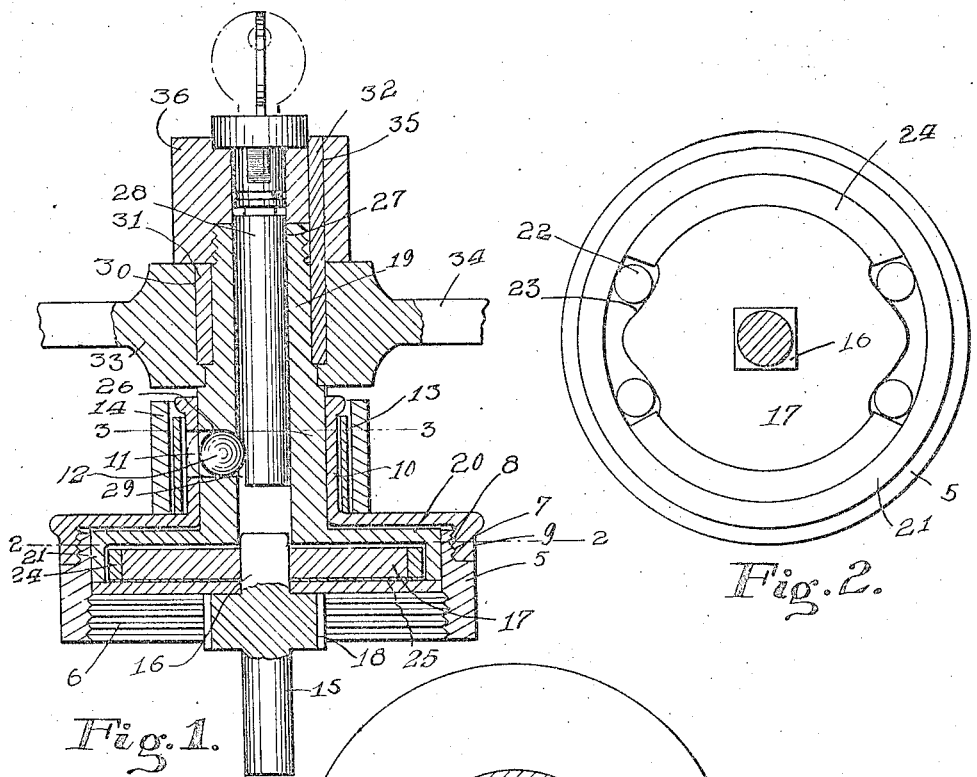
Fig. 1.
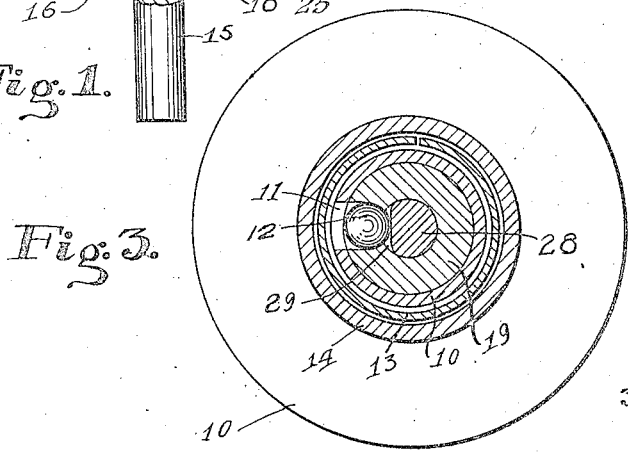
Fig. 2.
Fig. 3.
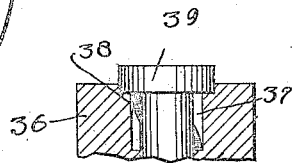
Fig. 4.
Witness
Inventor
G. R. Davidson.
By
Attorneys

UNITED STATES PATENT OFFICE.

GEORGE R. DAVIDSON, OF LENOX, MICHIGAN.

STEERING-WHEEL LOCK.

1,348,547.

Specification of Letters Patent.   Patented Aug. 3, 1920.

Application filed January 14, 1920. Serial No. 351,306.

*To all whom it may concern:*

Be it known that I, GEORGE R. DAVIDSON, a citizen of the United States, residing at Lenox, in the county of Macomb and State of Michigan, have invented a new and useful Steering-Wheel Lock, of which the following is a specification.

This invention relates to new and useful improvements in automobile locks, and more particularly to a novel locking means employed in connection with the steering wheel for locking the steering wheel against rotary movement.

The primary object of the invention is to provide means for locking the steering wheel to the steering column, which locking means is controlled by a predetermined key, thereby preventing unauthorized persons from moving the car equipped with the locking device.

A further object of the invention is to provide a novel means for clutching the steering wheel to an auxiliary stub shaft, for preventing movement of the steering wheel relative to the stub shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a longitudinal sectional view through the locking structure forming the subject matter of the present invention;

Fig. 2 is a sectional view taken on line 2—2 of Fig. 1;

Fig. 3 is a sectional view taken on line 3—3 of Fig. 1; and

Fig. 4 illustrates a fragmental detail view of the locking barrel forming a part of the present invention.

Referring to the drawing in detail, the reference character 5 designates the supporting ring of the lock, which is shown as internally threaded as at 6, the upper end thereof being externally threaded as at 7 to accommodate the internal threads 8 formed on the flange 9 of the extension 10.

This extension 10 is provided with an opening 11 in one of the side walls thereof, the opening being of a diameter slightly greater than the diameter of the locking ball 12 operating therein, and to be hereinafter more fully described, the metallic band 13, which is formed of suitable resilient material embraces the extension 10, and covers the opening 11 for guarding the opening and preventing displacement of the locking ball 12, when the same is moved to its locking position, the collar 14 however being supported in slightly spaced relation with the band 13 for securing the band 13 to the extension 10, but at the same time permitting a slight radial movement of the band 13 with relation of the collar 14.

The internal threads 6, of the supporting ring 5, are provided for association with a suitable threaded extremity of a steering column, not shown, the supporting ring forming a housing for the stub shaft 15 which has its upper squared end 16 seated in a squared opening formed in the clutch member 17, so that movement of the clutch member 17 produces a relative movement of the stub shaft.

In order that rotary movement of the stub shaft 15 may be transmitted to the usual steering post of an automobile, the teeth 18 are provided, which teeth mesh with the internal teeth formed on a gear supported by a steering post, not shown in the present drawing, but which is of the usual construction.

A wheel supporting shank 19 extends through the extension 10 and has an enlarged portion 20 housed by the supporting ring 5, the depending flanges 21 thereof contacting with the roller clutch members 22 disposed in the cut out portions 23 of the clutch member 17, the spacing collar 24 being provided to support the roller clutch members 22 in proper relation with each other, so that movement of the wheel supporting shank 19, and flange 21 thereof transmits a similar movement to the clutch member 17 through the roller clutch members 22, and consequently to the stub shaft with the result that the steering post, not shown, is correspondingly rotated, to accomplish the steering of the automobile.

The washer 25 is of a diameter equal to the interior diameter of the supporting ring 5 and contacts with the lower surface of the clutch member 17 and roller clutch members 22 for the purpose of securing the clutch member 17 and roller clutch members 22 against displacement longitudinally of the supporting ring 5.

Disposed within one of the side walls of the wheel supporting shank 19, and provided at a point in registry with the opening 11 of the extension 10, is an opening 26, which opening accommodates the locking ball 12, when the device is in an unlocked position, the thickness of the wheel supporting shank 19 being such as to permit the locking ball 12 to be supported out of contact with the walls of the opening 11.

This wheel supporting shank 19 is provided with a central longitudinal bore 27 of a diameter to accommodate the locking bar 28 which is of a length to extend from the upper end of the wheel supporting shank 19 downwardly terminating at a point below the lower wall of the opening 26, a portion of the locking bar 28 being cut away as at 29, to receive the locking ball 12, the edges of the locking bar 28 adjacent the cut out portion 29, being rounded to present camming surfaces to permit the ball to ride up over the camming surfaces to the opposite side of the locking bar 28 when the same is rotated, which rotation causes the locking ball 12 to move from its position within the opening 26 of the wheel supporting shank 19, to a position as indicated in dotted lines in Fig. 1 of the drawing, whereupon the ball 12 connects the extension 10 to the wheel supporting shank 19, and since the extension 10 has connection with the steering rod column, the wheel supporting shank 19 is locked to the steering rod collar thus preventing movement of the steering wheel, to be hereinafter more fully described.

Extending from the upper edges of the wheel supporting shank 19 are the opposed key-ways 30, which key-ways support the keys 31 and 32 each of which is disposed in a similar key-way formed in the hub 33 of the steering wheel 34 whereby the steering wheel 34 is locked to move with the wheel supporting shank 19.

The key 32 is relatively long, extending above the upper edge of the wheel supporting shank 19 and engages within the walls of the key-way 35 formed in the supporting column 36 forming a part of the lock proper, thus it will be seen that the column 36 moves with the wheel 34.

As shown, the grooves 37 are formed within the column 36, the same being shown as disposed on opposite sides thereof, which grooves accommodate the tumblers 38 carried by the key barrel 39, a suitable key being provided for retracting the tumblers 38 from the grooves 37 when the same is inserted in the barrel 39, and since the barrel 39 has connection with the locking bar 28, it is of course obvious that movement of the key within the barrel 39 causes a relative movement of the bar 28 and locking ball 12 to lock the steering wheel to the steering column.

In the operation of the device, assuming that the steering wheel 34 is to be locked, a key is inserted in the barrel 39, and the barrel 39 is now rotated to a position as indicated in dotted lines in Fig. 1 of the drawing, which rotation moves the locking ball 12 to a position as indicated in dotted lines in this figure, whereupon the device is moved to its locked position.

The key is now removed from the barrel 39 with the result that the tumblers 38 assume a position within the grooves 37 to lock the bar 28 in its locked position. If it becomes necessary to unlock the steering wheel 34, the key is again inserted in the barrel 39 to retract the tumblers 38 from the grooves 37 whereupon the locking bar 28 may be again rotated to cause the locking ball 12 to move from its position within the opening 11, to the position as indicated in full lines in Fig. 1 of the drawing.

Having thus described the invention, what I claim as new is:—

1. In a steering wheel lock, a supporting ring having connection with the steering column, an extension having connection with the supporting ring and having a lateral opening formed therein, a wheel supporting shank extending through the extension and having an opening in registry with the lateral opening of the extension, means for connecting a steering wheel to the wheel supporting shank, a locking ball disposed within the opening formed in the wheel supporting shank, and lock controlled means for forcing the locking ball into the opening formed in the extension, for locking the wheel supporting shank to the supporting ring.

2. In a steering wheel lock, a supporting ring connected to the steering wheel column, an extension having connection with the supporting ring to move therewith, said extension having a lateral opening, a wheel supporting shank associated with the extension and having an opening in registry with the lateral opening, a locking ball disposed within the opening of the wheel supporting shank, a locking bar contacting with the locking ball, means for locking the locking bar in its operative position, and said locking bar adapted to move the locking ball into the lateral opening of the extension for locking the wheel supporting shank to the extension.

3. In a steering wheel lock, a supporting ring secured to the steering column, an extension forming a part of the supporting ring and having an opening formed therein, a wheel supporting shank housed by the extension and having an opening in registry with the opening of the extension, a locking ball disposed within the opening of the wheel supporting shank, means for moving the ball into the opening formed in the extension, resilient means embracing the extension and covering the opening for restricting movement of the locking ball, a collar embracing the resilient means, and a steering wheel keyed to the wheel supporting shank.

In testimony that I claim the foregoing as my own, I have hereto affixed my signature in the presence of two witnesses.

GEORGE R. DAVIDSON.

Witnesses:
A. E. DWILLE,
GLENN BALCH.